(No Model.)
D. O'BRIEN.
ASTRONOMICAL MIRROR.
No. 408,511. Patented Aug. 6, 1889.
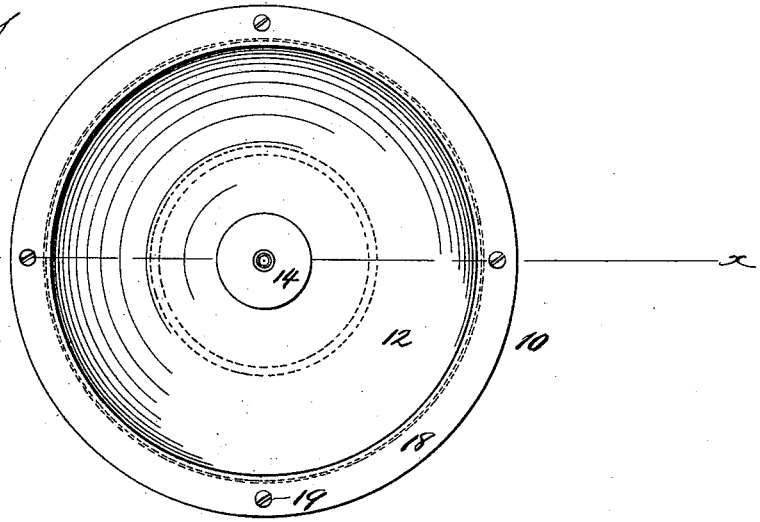
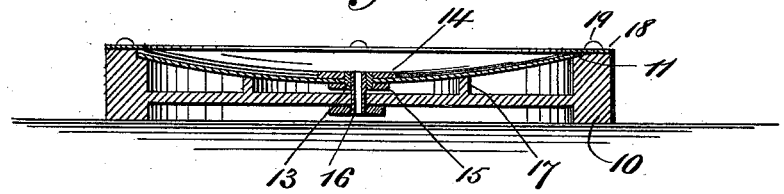
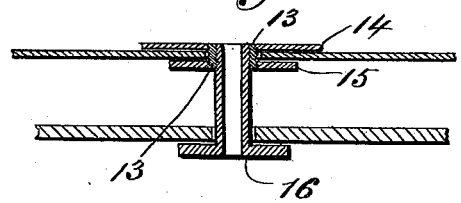
WITNESSES:
INVENTOR
D. O'Brien
BY
Munn & Co.
ATTORNEY

UNITED STATES PATENT OFFICE.

DENNIS O'BRIEN, OF OSWAYO, PENNSYLVANIA.

ASTRONOMICAL MIRROR.

SPECIFICATION forming part of Letters Patent No. 408,511, dated August 6, 1889.

Application filed February 9, 1889. Serial No. 299,293. (No model.)

*To all whom it may concern:*

Be it known that I, DENNIS O'BRIEN, of Oswayo, in the county of Potter and State of Pennsylvania, have invented a new and Improved Astronomical Mirror, of which the following is a full, clear, and exact description.

This invention relates to the production of astronomical mirrors, the object of the invention being to produce concave mirrors of long focus from plane-faced mirrors.

Reference is to be had to the accompanying drawings, forming a part of this specification, in which similar figures of reference indicate corresponding parts in all the views.

Figure 1 is a plan view of my improved astronomical mirror. Fig. 2 is a cross-sectional view thereof; and Fig. 3 is a detail view illustrating the connection between the mirror, its central tube, and the adjusting-nut.

It will of course be understood that mirrors such as I propose to form must be of a parabolic section, and that the vertical altitude of a parabolic segment cut off at right angles to the axis is found by dividing the square of its base by sixteen times its focal distance. Thus a true parabolic mirror six feet in diameter and seventy-two feet focus will have a central depression of just three-eighths of an inch.

From the above it will be seen that only a slight depression of the plane plate is required to bring about the central parabolic curvature.

Referring now to the drawings, 10 is a pan made of cast metal, or made in any other way so as to be extremely rigid, such pan being formed with a seat or shoulder 11, upon which there is placed a plane mirror 12, through the axis of which there is drilled a hole adapted to receive a tube 13, the ends of said tube being threaded to engage an upper disk 14 and a lower disk 15, the upper disk being somewhat larger than the lower one. The bottom of the pan 10 is formed with an aperture which registers with the aperture of the tube 13, and through this aperture in the bottom of the pan there is passed a headed and externally-threaded tube 16, that engages an internal thread formed upon the tube 13.

In applying the parts above described the two circular disks, which are well ground, are screwed to the tube 13 and jammed against the mirror while it is plane. Then they are very slightly separated, the separation being just enough to permit of the bending of the mirror 12 beneath the disk 14, the smaller disk 15 serving to prevent the splitting of the mirror, and by jamming it toward a tangency helps to fix its curve. The mirror 12, with its tube and disks, being placed upon the seat 11 of the pan 10, the threaded tube 16 is brought into engagement with the tube 13 and turned so as to draw the center of the mirror down against its own rigidity, bending it into a concave shape. This bending of the mirror is done while the mirror is set facing a test object, preferably the polar star.

The wrenches employed in turning the headed tube are long and light and reach across the pan, being arranged so that they will balance evenly, and in order that the work may be brought to an approximate exactness I prefer to graduate the under rim of the pan, so that, knowing the pitch of the thread of the tube 16, the approximate depression imparted to the mirror 12 may be readily ascertained.

Although not positively essential, I prefer to form the pan 10 with a circular flange 17, said flange being concentric with the axis of the mirror and turned to a proper height to support the mirror in the desired parabolic curve; and, although it is not positively essential, I prefer to place a rim 18 about the mirror, said rim being secured to the pan by screws 19, as shown.

The mirror constructed as above described may be made at an exceedingly low cost and is very accurate.

Having thus described my invention, I claim as new and desire to secure by Letters Patent—

1. The combination, with a pan formed with a mirror-seat, of a centrally-apertured mirror, a threaded sleeve passed through said aperture and held therein, and a retaining device engaging the sleeve and passing through the pan, substantially as described.

2. The combination, with a pan formed with a mirror-seat, of a centrally-apertured mirror, a sleeve passed through the mirror-aperture, disks engaging the sleeve and arranged upon opposite sides of the mirror, and an externally-threaded and headed sleeve which passes through the pan and engages an internal thread formed upon the mirror-sleeve, substantially as described.

3. The combination, with a pan formed with a mirror-seat, a central aperture, and an annular flange 17, of a mirror seated upon the pan and formed with a central aperture, a sleeve 13, which passes through the mirror-aperture, disks engaging the sleeve, and an externally-threaded and headed sleeve 16, which passes through the pan-aperture and engages an internal thread formed upon the sleeve 13, substantially as described.

DENNIS O'BRIEN.

Witnesses:
ARTHUR G. WELLS,
C. H. BRIZZEE.